United States Patent Office 2,735,775
Patented Feb. 21, 1956

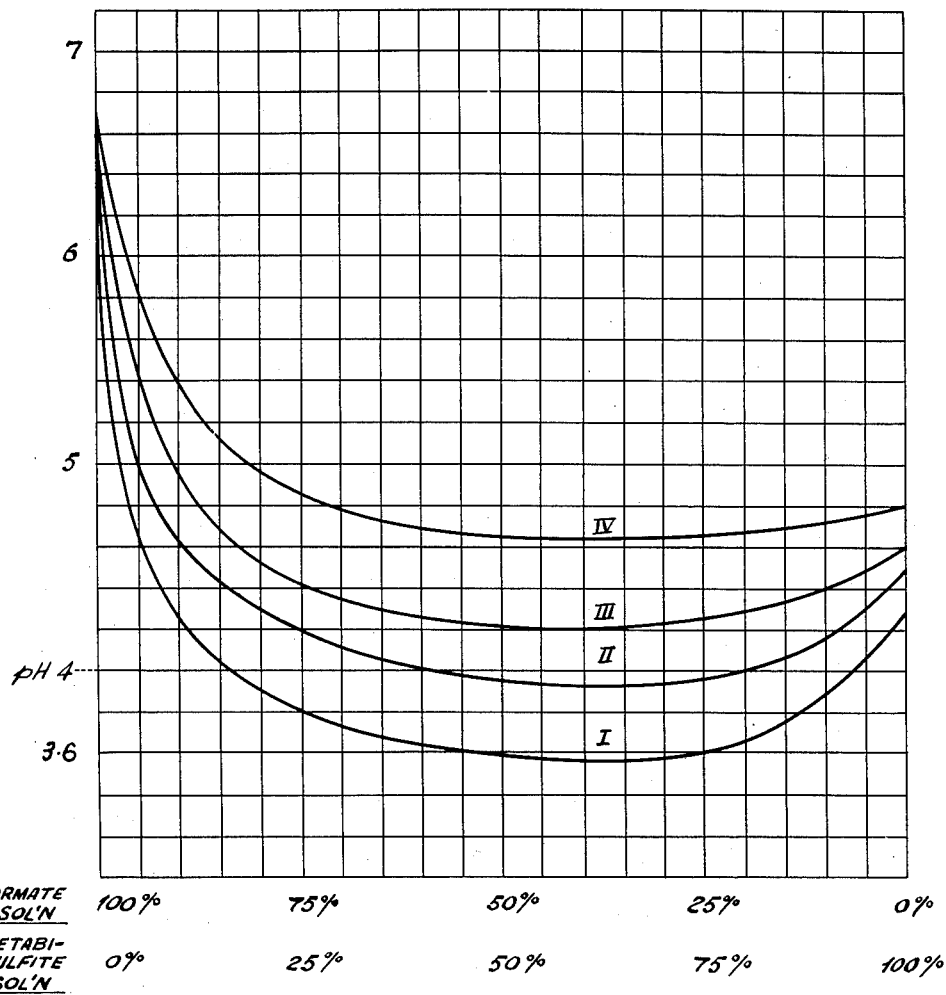

2,735,775
SILAGE ADDITIVE

Jesse B. Bronstein, Jr., and Franklin B. Wells, Allentown, Pa., assignors to Trojan Powder Company, a corporation of New York Application June 29, 1953, Serial No. 364,662

4 Claims. (Cl. 99—8)

This invention relates to an additive to silage, which acts to improve the quality of silage through suppressing undesirable bacteriological and chemical changes.

The invention relates, more particularly, to a silage preservative comprising a bisulfite and formate.

It is old in the art of silage to introduce a preservative with the chopped green fodder of corn, alfalfa, clover or the like. Among the chemical preservatives used separately are sodium bisulfite, calcium formate, and nitrites. It is known that a low pH of about 3.5–4.0 is desirable to prevent degradation of proteins in silage. For this reason, hydrochloric acid and sulfur dioxide have been introduced in spite of disadvantages or inconveniences.

We have now discovered a non-toxic and convenient composition combining the desirable features of the bisulfite and formate and also low pH. Our composition includes two materials that when dissolved together give a lower pH than either of the materials alone.

Briefly stated, our invention comprises the product of mixing an alkali metal bisulfite with an alkaline earth metal formate. In the preferred embodiment of the invention the bisulfite is sodium bisulfite ($NaHSO_3$) or metabisulfite ($Na_2S_2O_5$) and the formate is calcium formate $Ca(OOC.H)_2$. Another embodiment includes the addition also of a nitrite.

The unexpected effect of mixing the sulfite and the formate with each other upon the pH values of aqueous solutions is shown in the attached drawing to which reference is made. This drawing shows proportions of calcium formate and sodium bisulfite, in this case metabisulfite, that give pH levels below those obtained from corresponding solutions of either of the two components of the mixture.

The data for this drawing have been obtained by the use of aqueous solutions of sodium metabisulfite and calcium formate. The calcium formate was dissolved to give a saturated solution containing about 14% of the formate and the sodium metabisulfite dissolved to the form of a 25% solution. The two solutions so made were then mixed in the proportions by volume shown on the horizontal axis of the graph and the mixed solutions tested for pH. The results are plotted on Graph I. The mixing and testing were repeated with solutions of each of the salts in 10% concentration before mixing (Graph II), 5% (Graph III), and 2% (Graph IV).

It will be clear from the drawings that there is a certain range of proportions of the materials to each other which gives a lower pH than that of either of the chemicals alone. Considering particularly Graphs I and II, it is noted that there are several points in each graph which fall below the pH 4, that is, within the desirable range for silage additive, whereas neither the calcium formate nor the sodium metabisulfite alone give such a low pH.

In general, the proportion of the metabisulfite used on the dry basis should be within the range 30–90 parts for 100 parts of the mixture with the formate and, for the lowest pH results, about 65–85 parts of the metabisulfite.

There is some precipitation of calcium sulfite when the solutions are mixed.

The reaction may be represented as follows:

It is customary, when aqueous acidic and alkaline materials are mixed, to have reaction involving a neutralization of part at least of the excess acidity or basicity. Here mixing the bisulfite (acidic) and the calcium formate (slightly basic) produces actually an increase in the overall acidity.

When sodium bisulfite is used, the reaction in simplified form may be written as follows:

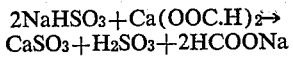

Since 2 mols of this bisulfite weigh 208 as compared to 190 for 1 mol of the metabisulfite, it is evident from the equations that the weight basis on which the two bisulfites are substitutable for each other are approximately equal parts by weight, although the accurate stoichiometric ratio is 208 pounds of the former for 190 of the metabisulfite.

In the silage, we use 3–10 pounds of our mixed additive per ton of the fodder, the amount with corn fodder being in the lower part of this range, red clover near the middle, and alfalfa near the top of the range. In other words, we increase the proportion of the additive for silages of known greater difficulty of preservation.

In such use in silage, it is necessary only to take our composition in granulated or powdered solid form and mix it into the silage, either at the cutter and blower stage or in the silo itself. The introduction with the blower improves the uniformity of the mix, although our soluble material, even if mixed somewhat unevenly, becomes distributed by solution and diffusion. Our additive retards objectionable decomposition of the protein without preventing desirable fermentation.

When nitrite is incorporated as a third component of our additive, the nitrite also serves an unexpected result. The nitrite decreases the loss of sulfur dioxide from the bisulfite during storage or holding of the mixture before use. The nitrite is used in the form of any economical non-toxic salt. Examples are the nitrite of sodium, potassium, or calcium.

The calcium sulfite, for which the chemical equations above show the formation, carries with it an appreciable part of the sulfur dioxide of the original bisulfite. We consider that the lactic acid, which develops in silage in storage, liberates the sulfur dioxide slowly, as the lactic acid develops, and gives calcium lactate as a by-product. Furthermore, this by-product calcium lactate, being insoluble, serves to retain lactic acid which otherwise might escape in solution in the liquor from the fermenting silage.

The invention will be further illustrated by detailed description in connection with the following specific examples of the practice of it.

Example 1

A silage additive is made from sodium metabisulfite and calcium formate. They are mixed in the form of powder and in the proportion of 15 parts of the calcium formate to 85 of the sodium metabisulfite.

Example 2

Sodium metabisulfite and calcium formate are mixed in the proportion of 35 parts of the formate to 65 of the metabisulfite.

Example 3

The formula of either Examples 1 or 2 is followed except that the metabisulfite is replaced by sodium bisulfite in the proportion of 2 mols of the latter to 1 mol of the former.

Example 4

To any of the compositions of Examples 1, 2 or 3 above, there is added finely divided sodium nitrite in the proportion of 2–10 parts for 100 parts of the bisulfite used.

In storage before use, the effect of nitrite in decreasing the premature decomposition of the bisulfite is shown by the decreased odor of sulfur dioxide from bags containing our three component composition.

It will be understood also that it is intended to cover all changes and modifications of the examples of the invention herein chosen for the purpose of illustration which do not constitute departures from the spirit and scope of the invention.

What we claim is:

1. A silage additive consisting essentially of sodium bisulfite and calcium formate in the proportion of 30–90 parts of the bisulfite for 100 of the combined weight of the bisulfite and formate.

2. A silage additive consisting essentially of sodium metabisulfite and calcium formate in the proportion of 30–90 parts of the bisulfite for 100 of the combined weight of the bisulfite and formate.

3. The silage additive of claim 1 including 2–10 parts of sodium nitrite for 100 parts of the sodium bisulfite.

4. The silage additive of claim 2 including 2–10 parts of sodium nitrite for 100 parts of the sodium metabisulfite.

References Cited in the file of this patent

UNITED STATES PATENTS

| | | |
|---|---|---|
| 2,160,167 | Pfeiffer | May 30, 1939 |

FOREIGN PATENTS

| | | |
|---|---|---|
| 1,860 | Great Britain | June 6, 1868 |